United States Patent
Yeh et al.

(10) Patent No.: US 10,002,469 B2
(45) Date of Patent: Jun. 19, 2018

(54) INCLINOMETER METHODS AND SYSTEMS FOR GENERATING AND CALIBRATING AN IN-VEHICLE INCLINATION ANGLE

(71) Applicant: THE UNIVERSITY OF HONG KONG, Hong Kong (CN)

(72) Inventors: Anthony Garon Yeh, Hong Kong (CN); Teng Zhong, Hong Kong (CN)

(73) Assignee: THE UNIVERSITY OF HONG KONG, Hong Kong (CN)

( * ) Notice: Subject to any disclaimer, the term of this patent is extended or adjusted under 35 U.S.C. 154(b) by 0 days. days.

(21) Appl. No.: 15/261,260

(22) Filed: Sep. 9, 2016

(65) Prior Publication Data

US 2018/0075669 A1 Mar. 15, 2018

(51) Int. Cl.
| | |
|---|---|
| *G07C 5/00* | (2006.01) |
| *G07C 5/08* | (2006.01) |
| *G06F 17/30* | (2006.01) |
| *G01S 19/13* | (2010.01) |
| *G01S 19/42* | (2010.01) |

(52) U.S. Cl.
CPC .............. *G07C 5/008* (2013.01); *G01S 19/13* (2013.01); *G01S 19/42* (2013.01); *G06F 17/30241* (2013.01); *G07C 5/0808* (2013.01)

(58) Field of Classification Search
CPC ....... G07C 5/008; G07C 5/0808; G01S 19/42; G01S 19/13; G06F 17/30241
See application file for complete search history.

(56) References Cited

U.S. PATENT DOCUMENTS

| | | | |
|---|---|---|---|
| 6,714,851 | B2 | 3/2004 | Hrovat et al. |
| 6,847,887 | B1 | 1/2005 | Casino |
| 7,650,252 | B2 | 1/2010 | Douglas |

(Continued)

FOREIGN PATENT DOCUMENTS

EP 0806632 B1 11/1997

OTHER PUBLICATIONS

Boroujeni, Behdad Yazdani et al., Road Grade Measurement Using In-Vehicle, Stand-Alone GPS with Barometric Altimeter, Journal of Transportation Engineering, Jun. 2013, 139(6):605-611.

(Continued)

*Primary Examiner* — Rodney A Butler
(74) *Attorney, Agent, or Firm* — Saliwanchik, Lloyd & Eisenschenk

(57) ABSTRACT

Provided herein are inclinometer methods and systems for generating an in-vehicle inclination angle ($\theta_r$). An inclinometer method can include measuring an acceleration ($\dot{v}$) of a vehicle or a vehicle member, measuring a pitch angular velocity (q) of a computer, measuring a longitudinal accelerometer signal ($a_{x,S}$) of the computer, generating an in-vehicle pitch angle ($\theta$) of the vehicle or the vehicle member, calibrating an inclinometer-vehicle relative misalignment pitch offset angle ($\theta_p$) of the vehicle or the vehicle member comprising a stationary-mode or a dynamic-mode, and generating an in-vehicle inclination angle ($\theta_r$) of the vehicle or the vehicle member.

17 Claims, 4 Drawing Sheets

(56) References Cited

U.S. PATENT DOCUMENTS

| | | |
|---|---|---|
| 8,566,034 B1 | 10/2013 | Van Wyck Loomis |
| 2010/0332118 A1 | 12/2010 | Geelen et al. |
| 2016/0001695 A1* | 1/2016 | Fennelly ............... B60W 40/11 |
| | | 701/49 |
| 2016/0069675 A1* | 3/2016 | Bando .................... G01C 21/16 |
| | | 701/519 |

OTHER PUBLICATIONS

Tseng, H. Eric et al., Estimation of land vehicle roll and pitch angles, Vehicle System Dynamics, May 2007, 45(5):433-443, Taylor & Francis Group.

Boroujeni, Behdad Yazdani et al., Road grade quantification based on global positioning system data obtained from real-world vehicle fuel use and emissions measurements, Atmospheric Environment, 2014, 85:179-186, Elsevier Ltd.

Zhang, Kaishan et al., Road Grade Estimation for On-Road Vehicle Emissions Modeling Using Light Detection and Ranging Data, Journal of the Air & Waste Management Association, Jun. 2006, 56(6):777-788, Taylor & Francis Group.

* cited by examiner

- $g$ : acceleration of gravity
- $\theta$ : in-vehicle pitch angle
- $\theta_r$ : in-vehicle inclination angle
- $\theta_p$ : inclinometer-vehicle misalignment pitch angle offset
- $v$ : vehicle velocity
- $\dot{v}$ : vehicle acceleration
- $a_{x,S}$ : longitudinal accelerometer signal

- GPS location of vehicle
- Map-matched location of vehicle $P_i$ (obtained from GIS-T database)
$= (x_i, y_i, z_i / \theta_i)$ $\beta_g$: Road grade
$\theta_p$: Inclinometer-vehicle misalignment pitch angle offset

INCLINOMETER METHODS AND SYSTEMS FOR GENERATING AND CALIBRATING AN IN-VEHICLE INCLINATION ANGLE

FIELD OF THE INVENTION

Generally disclosed herein are inclinometer methods and systems for generating an in-vehicle pitch angle. More particularly, generating the in-vehicle pitch angle can include calibrating a relative misalignment pitch offset angle in a stationary-mode and/or a dynamic-mode by measuring a position of the vehicle or vehicle member with a Global Positioning System and map-matching the position of the vehicle or vehicle member to a Geographic Information System database.

BACKGROUND OF THE INVENTION

It is often desired to know the angle of inclination of a vehicle or vehicle member with respect to the road or ground. For example, the in-vehicle inclination angle can be an important parameter for vehicle navigation and positioning, especially in high-density cities with multi-level road structures. In another example, it can be useful to monitor the positioning of construction equipment vehicle members, such as a boom, dipper stick, bucket, grader, scraper, and chassis platform. Generally, the in-vehicle inclination angle is measured with an inclinometer that is fixed to the vehicle. These fixed-inclinometers require an installation calibration where it is assumed that there will be no relative misalignment pitch offset angle between the inclinometer and the body frame of the vehicle, i.e., the angle measured is the road grade without an offset of the pitch angle between the positioning of the inclinometer and the actual road grade. Therefore, fixed-inclinometers can have drawbacks. For example, fixed-inclinometers often cannot distinguish between gravitational acceleration and non-gravitational sources of acceleration. Linear, or translational, motions and vibrations can also produce measurable accelerations. These sources of acceleration can result in undesired and erroneous output signals from an inclinometer. In some cases, the undesired signals can be large in comparison to the desired inclination measurement, rendering the sensor output unreliable and unusable.

BRIEF SUMMARY

Due to the challenges discussed above, there is a need for new inclinometer methods and systems for generating the angle of inclination for a vehicle or a vehicle member that includes a calibration that subtracts the relative misalignment pitch offset angle.

Disclosed herein are inclinometer methods and systems for generating and calibrating an in-vehicle inclination angle ($\theta_r$) of a vehicle or a vehicle member. In one specific embodiment, the inclinometer method can include measuring an acceleration ($\dot{v}$) of a vehicle or a vehicle member; measuring a pitch angular velocity (q) of a computer; measuring a longitudinal accelerometer signal ($a_{x,S}$) of the computer; generating an in-vehicle pitch angle ($\theta$) of the vehicle or a vehicle member; calibrating an inclinometer-vehicle relative misalignment pitch offset angle ($\theta_p$) of the vehicle or a vehicle member comprising a stationary-mode or a dynamic-mode; and generating an in-vehicle inclination angle ($\theta_r$) of the vehicle or the vehicle member. The calibration in stationary-mode and/or the dynamic-mode can include the steps of: measuring the vehicle or the vehicle member position with a Global Positioning System; and map-matching the vehicle or the vehicle member position to a Geographic Information System database.

In another specific embodiment, the system for generating an in-vehicle inclination angle ($\theta_r$) of the vehicle or a vehicle member can include: one or more computers, wherein the one or more computers comprise one or more processors and one or more sensors; and a memory storing instruction which, when executed by the one or more processors, causes the one or more processors to: receive an acceleration ($\dot{v}$) of a vehicle or a vehicle member; receive a pitch angular velocity (q) of the one or more computers; receive a longitudinal accelerometer signal ($a_{x,S}$) of the one or more computers; apply the operations to generate in-vehicle pitch angle ($\theta$) of the vehicle or a vehicle member; apply the operations to calibrate an inclinometer-vehicle relative misalignment pitch offset angle ($\theta_p$) of the vehicle or a vehicle member comprising a stationary-mode or a dynamic-mode; apply the operations to the in-vehicle pitch angle ($\theta$) and the inclinometer-vehicle relative misalignment pitch offset angle ($\theta_p$) to generate a in-vehicle inclination angle ($\theta_r$) of the vehicle or a vehicle member; and present the in-vehicle inclination angle ($\theta_r$) to a display unit of the one or more computers.

In another specific embodiment, a non-transitory computer readable medium can include instructions which, when implemented by one or more computers, causes the one or more computers to: receive an acceleration ($\dot{v}$) of a vehicle or a vehicle member; receive a pitch angular velocity (q) of the one or more computers; receive a longitudinal accelerometer signal ($a_{x,S}$) of the one or more computers; apply the operations to generate in-vehicle pitch angle ($\theta$) of the vehicle or a vehicle member; apply the operations to calibrate an inclinometer-vehicle relative misalignment pitch offset angle ($\theta_p$) of the vehicle or a vehicle member comprising a stationary-mode or a dynamic-mode; apply the operations to the in-vehicle pitch angle ($\theta$) and the inclinometer-vehicle relative misalignment pitch offset angle ($\theta_p$) to generate a in-vehicle inclination angle ($\theta_r$) of the vehicle or a vehicle member; and present the in-vehicle inclination angle ($\theta_r$) to a display unit of the one or more computers.

BRIEF DESCRIPTION OF THE DRAWINGS

In the following detailed description, reference is made to the accompanying figures, depicting exemplary, non-limiting, and non-exhaustive embodiments of the invention. So that the manner in which the above recited features of the present invention can be understood in detail, a more particular description of the invention, briefly summarized above, can be had by reference to the embodiments, some of which are illustrated in the appended figures. It should be noted, however, that the appended figures illustrate only some embodiments of this invention and are therefore not to be considered limiting of its scope, for the invention can admit to other equally effective embodiments.

DETAILED DESCRIPTION OF THE INVENTION

Figure 1:
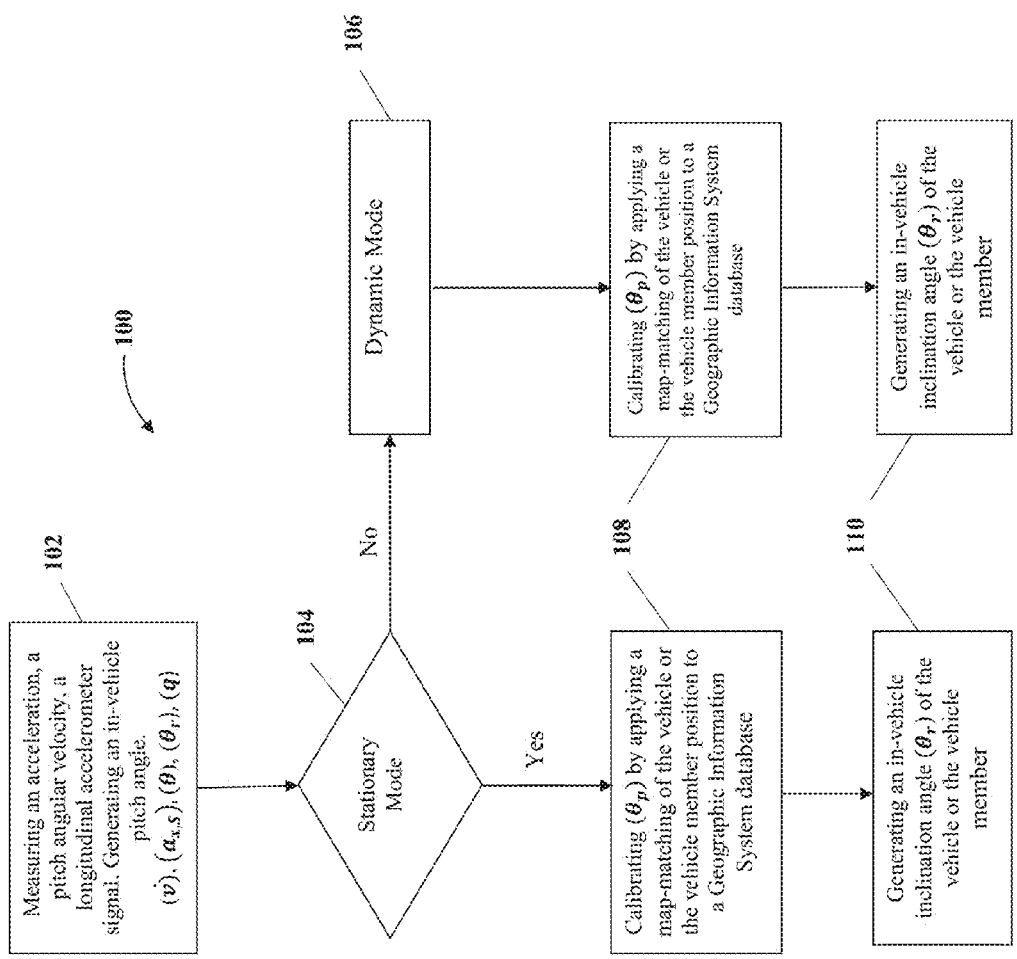
FIG. 1 illustrates an example process by which an inclinometer system and method can generate an in-vehicle inclination angle ($\theta_r$) of a vehicle.

FIG. 1 illustrates an example of an inclinometer method 100 that can generate an in-vehicle inclination angle ($\theta_r$) of the vehicle or a vehicle member. The inclinometer method 100 for generating an in-vehicle inclination angle ($\theta_r$) of the vehicle or a vehicle member can include, but is not limited to, the following steps: measuring an acceleration ($\dot{v}$) of a vehicle or a vehicle member 102; measuring a pitch angular velocity (q) of one or more computers 102; measuring a longitudinal accelerometer signal ($a_{x,S}$) of the one or more computers 102; generating an in-vehicle pitch angle ($\theta$) 102 of a vehicle; calibrating an inclinometer-vehicle relative misalignment pitch offset angle ($\theta_p$) comprising a stationary-mode 104 or a dynamic-mode 106. The calibration using the stationary-mode 104 and/or the dynamic-mode calibration 106 can include, but is not limited to, the steps of: measuring the vehicle or the vehicle member position with a Global Positioning System (GPS) 108; and map-matching the vehicle or the vehicle member position to a Geographic Information System (GIS) database 108. The inclinometer method 100 can then include generating an in-vehicle inclination angle ($\theta_r$) of the vehicle or the vehicle member.

Figure 2:
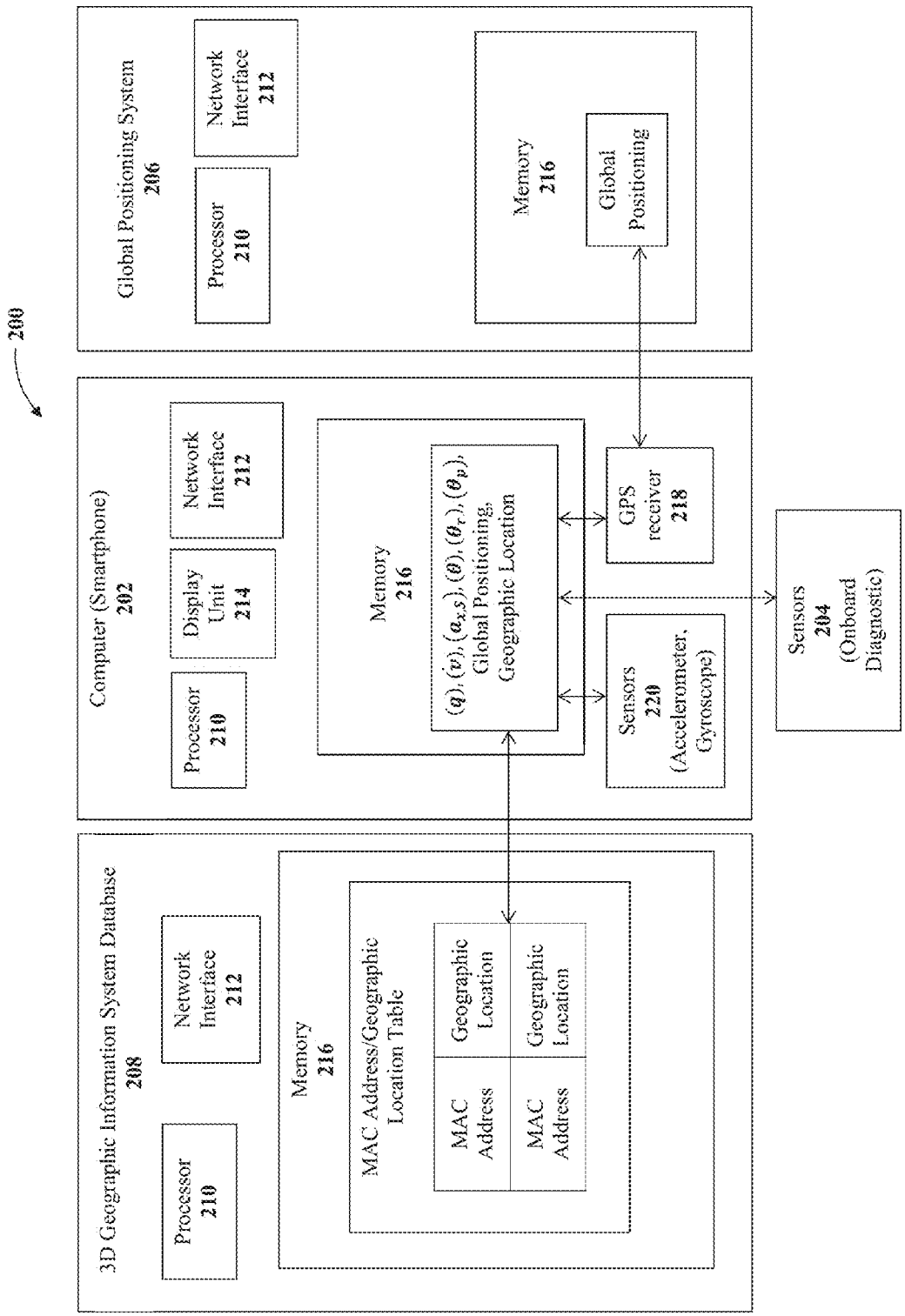
FIG. 2 illustrates an example of an inclinometer system can generate an in-vehicle inclination angle ($\theta_r$) of a vehicle.

FIG. 2 illustrates an example of an inclinometer system 200 that can generate an in-vehicle pitch angle ($\theta$). The inclinometer system 200 for generating an in-vehicle pitch angle ($\theta$) of a vehicle or a vehicle member can include, but is not limited to, an arrangement of: one or more computers and/or computing devices 202, such as smartphones, tablets, servers, databases, and laptops; one or more sensors 204; and one or more non-transitory computer readable media, such as a magnetic disks and cards; any of which can include microelectromechanical systems (MEMS).

The sensors 204 can include, but are not limited to: accelerometers, magnetometers, speedometers, onboard diagnostic sensors, and gyroscopes. The sensors 204 can be attached to the vehicle or vehicle member. The onboard diagnostics sensor can include, but is not limited to, onboard diagnostics sensors that meet the OBD-II specification. The onboard diagnostics sensor can receive the vehicle velocity (v) from the engine control unit (ECU). The onboard diagnostics sensor can transmit by a wireless technology, such as Bluetooth and/or Wi-Fi, to the computers and/or computing devices 202. The vehicle acceleration ($\dot{v}$) can be generated by the computers and/or computing devices 202 from the measured vehicle velocity (v).

The server can include, but is not limited to, a Global Position System 206. The Global Position System 206 can include, but is not limited to: one or more processors 210; one or more network interfaces 212; and memory 216.

The database can include, but is not limited to, a 3D Geographic Information System Database 208. The 3D Geographic Information System Database 208 can include, but is not limited to: one or more processors 210 and one or more network interfaces 212; and memory 216.

The computer and/or computing device 202 can include, but are not limited to: a processor 210; a network interface 212; an input/output devices, such as a display unit 214; memory 216; one or more GPS receivers 218; one or more sensors 220; and one or more transceivers (not shown). The sensors 220 can include, but are not limited to: accelerometers, magnetometers, speedometers, compasses, and gyroscopes. The sensors 220 can be attached to the computers and/or computing devices 202. The GPS receiver, accelerometer, and gyroscope can be an integrated microelectromechanical system. The GPS receiver can receive the (x, y) coordinates of the vehicle and/or the vehicle member and/or the computer and/or computing device 202. The accelerometer can measure the acceleration of the vehicle and/or the vehicle member and/or the computer and/or computing device 202 in the longitudinal direction. The gyroscope can measure the pitch angular velocity (q) of the vehicle and/or the vehicle member and/or the computer and/or computing device 202, where the pitch angle is one of the three Euler angles that are used to describe the orientation of a frame of reference.

The computer and/or computing device 202 can be physically attached or not physically attached to the vehicle and/or the vehicle member. In other words, the computer and/or computing device 202 can be portable. For example, the computer and/or computing device 202 can be a smartphone that is held in the hand of the user. In another example, the computer and/or computing device 202 can be placed on any surface of the vehicle and/or vehicle member to measure the in-vehicle inclination angle ($\theta_r$).

Figure 3:
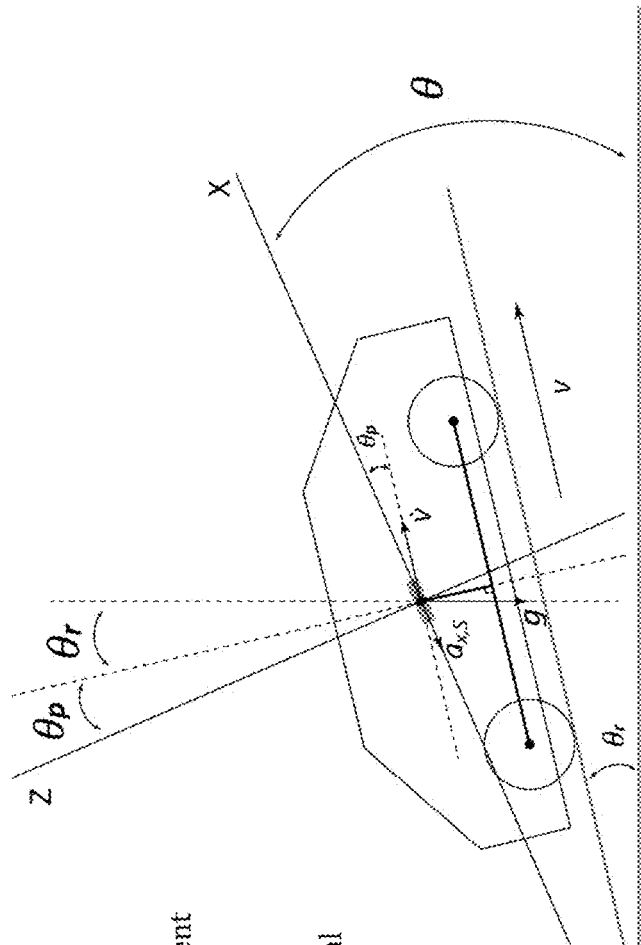
FIG. 3 illustrates an example of an inclinometer system and method for generating an in-vehicle inclination angle ($\theta_r$) using an in-vehicle pitch angle ($\theta$) and a relative misalignment pitch offset angle ($\theta_p$) of a vehicle.

FIG. 3. illustrates inclinometer methods and systems for generating an in-vehicle inclination angle ($\theta_r$) using an in-vehicle pitch angle ($\theta$) and a relative misalignment pitch offset angle ($\theta_p$) of a vehicle. The an in-vehicle inclination angle ($\theta_r$) can be generated with the computer and/or computing device by applying the operations of equation (1):

$$\theta_r = \theta - \theta_p \qquad (1),$$

where $\theta_r$ is the in-vehicle inclination angle and $\theta_p$ is the inclinometer-vehicle relative misalignment pitch offset angle. One or more sensors, such as a gyroscope, can measure the in-vehicle inclination angle ($\theta_r$). Also, one or more sensors, such as an accelerometer, can measure the acceleration of the vehicle ($\dot{v}$), which is defined by equation (2):

$$\dot{v} = \frac{dv}{dt}. \qquad (2)$$

The acceleration of the vehicle ($\dot{v}$) can include the acceleration of the vehicle in a forward direction. The acceleration of the vehicle ($\dot{v}$) can be generated by the computer and/or computing device from the vehicle velocity (v) measured by the onboard diagnostics. The variable, $a_{x,S}$, is the longitudinal accelerometer signal of the computer and/or computing device, which can be expressed as equation (3):

$$a_{x,S} = a_x - g \sin \theta \qquad (3),$$

where g is the gravitational acceleration constant and $a_x$ is the vehicle acceleration in relation to the x-component of a vehicle coordinate system. The acceleration of the vehicle ($\dot{v}$) can be resolved into its components, and $a_x$ can be expressed as equation (4):

$$a_x = \dot{v} \cos \theta_p \qquad (4).$$

Using equations (1)-(4), $a_{x,S}$ can be rewritten as equation (5):

$$a_{x,S} = \dot{v}\cos\theta_p - g\sin(\theta_r + \theta_p) = \begin{bmatrix} \dot{v} & -g \end{bmatrix} \begin{bmatrix} \cos\theta_p \\ \sin(\theta_r + \theta_p) \end{bmatrix}. \qquad (5)$$

Because accelerometers can be accurate in their long term estimation, but inaccurate in the short term due to continuous noise, and gyroscopes can be accurate in their short term estimation, but inaccurate in the long term due to the errors accumulated in the orientation measurements caused by the gyroscope drift, the in-vehicle pitch angle ($\theta$) can be generated with a computer by applying the operations of equation (6):

$$\theta = \theta_{ref} + \Sigma \dot{\theta} dt \qquad (6),$$

where $\theta_{ref}$ is a reference in-vehicle pitch angle and $\dot{\theta}$ is the in-vehicle pitch angle bias. When the vehicle is in steady driving maneuvers, the reference in-vehicle pitch angle ($\theta_{ref}$) can be expressed as equation (7):

$$\theta_{ref} = \sin^{-1}\left(\frac{\dot{v}\cos\theta_p - \alpha_{x,S}}{g}\right), \qquad (7)$$

Equation (7) can be simplified to equation (8):

$$\theta_{ref} = \frac{\dot{v}\cos\theta_p - \alpha_{x,S}}{g}. \qquad (8)$$

By assuming there is little or no roll movement, equation (1) can be rewritten as equation (9):

$$\dot{\theta} = q \qquad (9),$$

where (q) is the pitch angular velocity of the computer and/or computing device 202. The pitch angular velocity (q) of the computer and/or computing device 202 can be measured with the gyroscope of the computer and/or computing device 202. From equations (8) and (9), the in-vehicle pitch angle ($\theta$) can be simplified to equation (10):

$$\theta = \frac{\dot{v}\cos\theta_p - \alpha_{x,S}}{g} + \sum qdt. \qquad (10)$$

Further assuming that the in-vehicle inclination angle ($\theta_p$) is small, equation (10) can be generalized to equations (11) and (12):

$$\theta = \frac{\dot{v} - \alpha_{x,S}}{g} + \sum qdt, \qquad (11)$$

$$\theta_r = \frac{\dot{v} - \alpha_{x,S}}{g} + \sum qdt - \theta_p. \qquad (12)$$

The in-vehicle pitch angle ($\theta$) and the in-vehicle inclination angle ($\theta_r$) can be generated with a computer by applying the operations of equations (11) and (12). The vehicle pitch angle ($\theta$) and the in-vehicle inclination angle ($\theta_r$) can be presented to a display unit of a computer for the user.

One or more filtering algorithms can be used to integrate the sensors together and to reduce the system noise for the in-vehicle pitch angle ($\theta$). The filter algorithm can include, but is not limited to, a Kalman filter and/or particle filter. The accuracy of the in-vehicle inclination angle ($\theta_r$) will tend to improve with a greater accuracy in the measured and generated inclinometer-vehicle relative misalignment pitch offset angle ($\theta_p$). Moreover, the inclinometer-vehicle relative misalignment pitch offset angle ($\theta_p$) can be regarded as a constant variable if the inclinometer system is not moving during the measurement.

Automatic 3D GIS-Aided Calibration Using a Stationary and/or Dynamic Mode

In many embodiments, the inclinometer methods and systems can include a stationary-mode and a dynamic-mode for calibrating the inclinometer-vehicle relative misalignment pitch offset angle ($\theta_p$). The calibration using the stationary-mode and/or the dynamic-mode calibration can include, but is not limited to, the steps of: measuring the vehicle or the vehicle member position with a Global Positioning System (GPS); and map-matching the vehicle or the vehicle member position to a Geographic Information System (GIS) database. When the inclination methods and systems need to be calibrated, a road segment with a minimum length and a constant road grade can be used as a candidate road segment. After the candidate road segment is identified, the inclination systems and methods can be map-matched to the 3D GIS database and external positioning system, such as a GPS. The 3D GIS database can include an attribute that records a road grade of a road segment, which can be used for finding and removing the relative misalignment pitch offset angle ($\theta_p$). When the vehicle drives or stops on the candidate road segment for calibration, the relative misalignment pitch offset angle ($\theta_p$) can be generated, and then the inclinometer method and/or system can calibrate the in-vehicle pitch angle ($\theta$) by with the stored road grade value of the candidate road segment found in the 3D GIS database.

Stationary-Mode Calibration

When the vehicle using the inclinometer methods and/or systems has little to no acceleration, e.g., when the vehicle is stopped or the road segment has a long length and constant road grade, a stationary-mode calibration can be used. Stationary-mode calibration can include, but is not limited to, the steps of: measuring the vehicle or the vehicle member position with a Global Positioning System; and map-matching the vehicle or the vehicle member position to a Geographic Information System database. For stationary-mode calibration, equation (10) can then be rewritten as equation (13):

$$\theta = \frac{-\alpha_{x,S}}{g}. \qquad (13)$$

The GIS database can record the road grade as an attribute of the candidate road segment. The true road grades angle ($\theta_C$) can be found from a stored road grade map by map-matching. The inclinometer method and/or system can generate the inclinometer-vehicle relative misalignment pitch offset angle ($\theta_p$) by using equation (14):

$$\theta_p = \theta - \theta_C \qquad (14).$$

The calculated inclinometer-vehicle relative misalignment pitch offset angle ($\theta_p$) can then be stored and used for future calibration according to equation (1).

Dynamic-Mode Calibration

While the inclinometer methods and/or systems can use the stationary-mode calibration when the vehicle is stopped or has little or no acceleration, the inclinometer methods and/or systems can use a dynamic-mode calibration when the vehicle is accelerating. For dynamic-mode calibration, the length of the candidate road segment can be much longer. Like the stationary-mode calibration, the dynamic mode calibration can include, but is not limited to, the steps of: measuring the vehicle or the vehicle member position with a GPS; and map-matching the vehicle or the vehicle member position to a GIS database. The in-vehicle pitch angle (θ) generated when a vehicle is under acceleration can be subject to various noises. Hence, a number of in-vehicle pitch angle (θ) measurements can be used to generate an accurate estimation of the road grade. For example, the road grade angle estimated at time, t, can be found with equation (16):

$$\theta_{r,t} = \theta_t - \theta_p \qquad (16),$$

where $\theta_t$ is the in-vehicle pitch angle estimated at time, t, and $\theta_p$ is the inclinometer-vehicle relative misalignment pitch offset angle, which can be assumed to be constant. A threshold value for the number of in-vehicle pitch angle measurements can be used for the dynamic-mode calibration according to equation (17):

$$\theta_p = \frac{\sum_{0}^{k-1}(\theta_{r,t,k} - \beta_0)}{k}, \qquad (17)$$

where k is the minimum number of generated in-vehicle pitch angles (θ), and $\beta_0$ is the road grade angle of the candidate road segment used for the dynamic-mode calibration.

Figure 4:
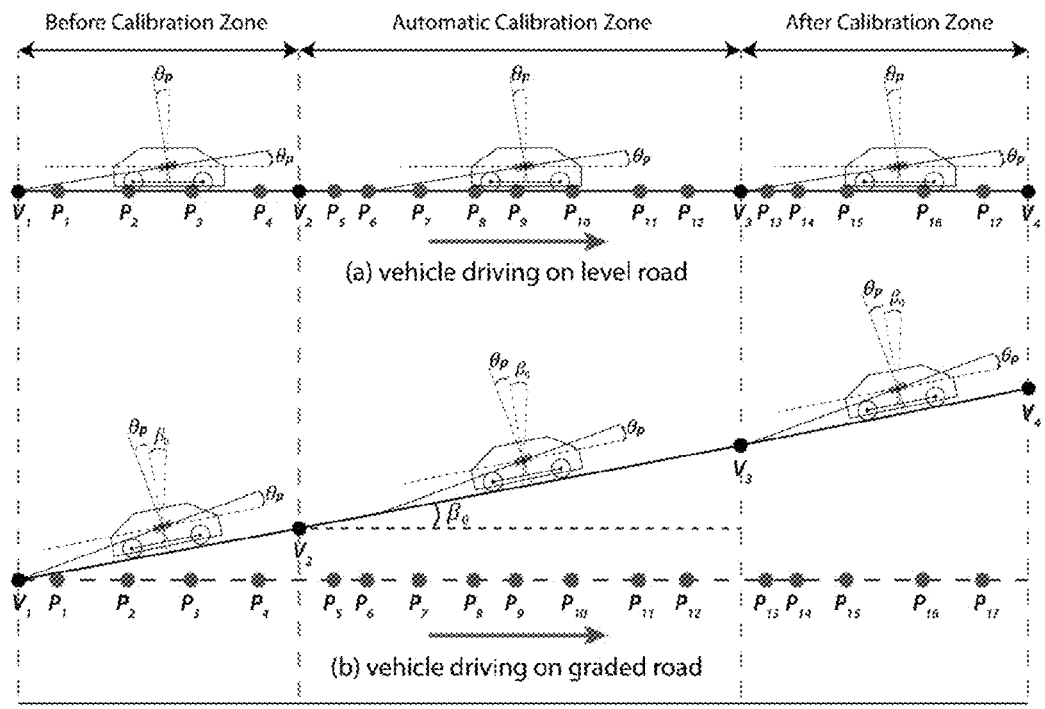
FIG. 4 illustrates an example of a dynamic-mode that calibrates an inclinometer-vehicle relative misalignment pitch offset angle ($\theta_p$), which then can be used to generate an in-vehicle inclination angle ($\theta_r$).
Figure 4:
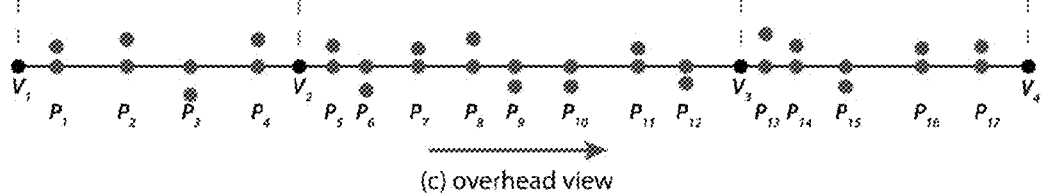

FIG. 4 illustrates an example of a dynamic-mode calibration. Here, a vehicle is driving on a road, which has been divided into three parts—the Before Calibration Zone, the Automatic Calibration Zone, and the After Calibration Zone. The points $V_1$, $V_2$, $V_3$, and $V_4$ are used to mark the boundaries of each zone. FIG. 4(a) illustrates the situation where the road grade of the Automatic Calibration Zone is zero. FIG. 4(b) illustrates the situation where the road grade of the Automatic Calibration Zone is $\beta_0$. The vehicle under acceleration can be map-matched to the road using the 3D GIS map and the GPS positioning. FIG. 4(c) is the overhead view of the map-matching process. After a sufficient number of in-vehicle pitch angles (θ) are generated and recorded. Then, the inclinometer methods and/or systems can calibrate the inclinometer-vehicle relative misalignment pitch offset angle ($\theta_p$) with equation (17) by using both the generated in-vehicle pitch angles (θ) and the road grade of the candidate road segment found in the 3D GIS map. As the inclinometer-vehicle relative misalignment pitch offset angle ($\theta_p$) can be assumed to be constant, it can subtracted from the road grade provided by the GIS map by using equation (16).

Vehicles that can use the inclinometer methods and/or systems of embodiments of the subject invention can include, but are not limited to: cars; trucks; and construction equipment vehicles; such as tractors, bulldozers, graders, and scrapers. Vehicle members that can use the inclinometer methods and/or systems can include, but are not limited to, booms; dipper sticks; buckets; platforms; blades; and chassis. An inclinometer system as described herein can be placed anywhere on and/or inside the vehicle or vehicle member. Surfaces inside vehicles and vehicle members are often not parallel to the vehicle body frame and/or chassis so a calibration procedure can be used to remove the effect of the relative misalignment pitch offset angle between the in-vehicle portable inclinometer and the vehicle body frame to obtain the correct in-vehicle inclination angle.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility. It is therefore intended by the appended claims to cover any and all such applications, modifications and embodiments within the scope of the present invention.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections. Some implementations include electronic components, for example microprocessors, storage and memory that store computer program instructions in a machine-readable or computer-readable medium (alternatively referred to as computer-readable storage media, machine-readable media, or machine-readable storage media, any or all of which can be non-transitory). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

The subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects of the disclosed subject matter, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

As used herein, the singular forms "a", "an", and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising". As used herein, use of the term "including" as well as other forms, such as "includes," and "included," is not limiting.

All patents, patent applications, provisional applications, and publications referred to or cited herein are incorporated by reference in their entirety, including all figures and tables, to the extent they are not inconsistent with the explicit teachings of this specification.

What is claimed is:

1. An inclinometer method for generating an in-vehicle inclination angle ($\theta_r$) of the vehicle or a vehicle member, the method comprising:

measuring an acceleration ($\dot{v}$) of the vehicle or vehicle member;

measuring a pitch angular velocity (q) of a computer;

measuring a longitudinal accelerometer signal ($a_{x,S}$) of the computer;

generating an in-vehicle pitch angle ($\theta$);

calibrating an inclinometer-vehicle relative misalignment pitch offset angle ($\theta_p$) of the vehicle or vehicle member using a stationary-mode or a dynamic-mode based on a road grade of a road segment; and generating an in-vehicle inclination angle ($\theta_r$) of the vehicle or vehicle member, wherein the vehicle is present, and wherein the vehicle is selected from the group consisting of: a car, a truck, and a construction equipment vehicle.

2. The inclinometer method of claim 1, wherein calibration using the stationary-mode or the dynamic-mode comprises the steps of:

measuring a position of the vehicle or vehicle member with a Global Positioning System; and map-matching the position of the vehicle or vehicle member to a Geographic Information System database.

3. The inclinometer method of claim 2, wherein the Geographic Information System database comprises an attribute that records the road grade.

4. The inclinometer method of claim 1, wherein generating the inclinometer-vehicle relative misalignment pitch offset angle ($\theta_p$) is preformed on a smartphone.

5. The inclinometer method of claim 1, wherein the vehicle member is present, and wherein the vehicle member is selected from the group consisting of: a boom; a dipper stick; a bucket; a platform; a blade; and a chassis.

6. A system for generating an in-vehicle inclination angle ($\theta_r$) of the vehicle or a vehicle member, the system comprising:

one or more computers, wherein the one or more computers comprise one or more processors and one or more sensors; and a memory storing instruction which, when executed by the one or more processors, causes the one or more processors to:

receive an acceleration ($\dot{v}$) of the vehicle or vehicle member;

receive a pitch angular velocity (q) of the one or more computers;

receive a longitudinal accelerometer signal ($a_{x,S}$) of the one or more computers;

apply the operations to generate an in-vehicle pitch angle ($\theta$) of the vehicle or vehicle member;

calibrate an inclinometer-vehicle relative misalignment pitch offset angle ($\theta_p$) of the vehicle or vehicle member using a stationary-mode or a dynamic-mode based on a road grade of a road segment;

apply the in-vehicle pitch angle ($\theta$) to the inclinometer-vehicle relative misalignment pitch offset angle ($\theta_p$) to generate an in-vehicle inclination angle ($\theta_r$) of the vehicle or vehicle member; and present the in-vehicle inclination angle ($\theta_r$) to a display unit in operable communication with the one or more processors, wherein the vehicle is present, and wherein the vehicle is selected from the group consisting of: a car, a truck, and a construction equipment vehicle.

7. The system of claim 6, wherein, when executed by the one or more processors, the memory storing instruction further causes the one or more processors to present the in-vehicle pitch angle ($\theta$) to the display unit.

8. The system of claim 6, wherein the stationary-mode or the dynamic-mode, when executed by the one or more processors, causes the one or more processors to:

receive a position of the vehicle or vehicle member with a Global Positioning System; and apply a map-matching of the position of the vehicle or vehicle member to a Geographic Information System database.

9. The system of claim 8, wherein the Geographic Information System database comprises an attribute that records the road grade.

10. The system of claim 6, wherein the system is portable.

11. The system of claim 6, wherein the one or more computers comprise a smartphone.

12. The system of claim of claim 6, wherein the vehicle member is present, and wherein the vehicle member is selected from the group consisting of: a boom; a dipper stick; a bucket; a platform; a blade; and a chassis.

13. A non-transitory computer readable medium comprising instructions which, when implemented by one or more computers, causes the one or more computers to:

receive an acceleration ($\dot{v}$) of a vehicle or a vehicle member;

receive a pitch angular velocity (q) of the one or more computers;

receive a longitudinal accelerometer signal ($a_{x,S}$) of the one or more computers;

generate in-vehicle pitch angle ($\theta$) of the vehicle or vehicle member;

calibrate an inclinometer-vehicle relative misalignment pitch offset angle ($\theta_p$) of the vehicle or vehicle member using a stationary-mode or a dynamic-mode based on a road grade of a road segment;

apply the in-vehicle pitch angle ($\theta$) to the inclinometer-vehicle relative misalignment pitch offset angle ($\theta_p$) to generate an in-vehicle inclination angle ($\theta_r$) of the vehicle or vehicle member; and present the in-vehicle inclination angle ($\theta_r$) to a display unit of the one or more computers, wherein the vehicle is present, and wherein the vehicle is selected from the group consisting of: a car, a truck, and a construction equipment vehicle.

14. The non-transitory computer readable medium of claim 13, wherein the stationary-mode or the dynamic-mode comprises instructions which, when implemented by the one or more computers, causes the one or more computers to:

receive a position of the vehicle or vehicle member with a Global Positioning System; and apply a map-matching of the position of the vehicle or vehicle member to a Geographic Information System database.

15. The non-transitory computer readable medium of claim 14, wherein the Geographic Information System database comprises an attribute that records the road grade.

16. The non-transitory computer readable medium of claim 13, wherein the one or more computers comprises a smartphone.

17. The non-transitory computer readable medium of claim 13, wherein the vehicle member is present, and wherein the vehicle member is selected from the group consisting of: a boom, a dipper stick, a bucket, a platform, a blade, and a chassis.

* * * * *

UNITED STATES PATENT AND TRADEMARK OFFICE
CERTIFICATE OF CORRECTION

PATENT NO. : 10,002,469 B2
APPLICATION NO. : 15/261260
DATED : June 19, 2018
INVENTOR(S) : Anthony Garon Yeh and Teng Zhong Page 1 of 1

It is certified that error appears in the above-identified patent and that said Letters Patent is hereby corrected as shown below:

In the Claims

Column 11,
Line 48, "apply the operations to generate an" should read --generate an--.

Signed and Sealed this
Twenty-ninth Day of January, 2019

Andrei Iancu
*Director of the United States Patent and Trademark Office*